United States Patent [19]

Altman

[11] 4,161,140

[45] Jul. 17, 1979

[54] PROTECTED ROCKER-ARM SAFETY DEVICE FOR PRESSES

[76] Inventor: Paul C. Altman, 2821 Valley Forge Rd., Lisle, Ill. 60532

[21] Appl. No.: 829,591

[22] Filed: Sep. 1, 1977

[51] Int. Cl.² .............................. B30B 1/08; F16P 7/00
[52] U.S. Cl. .................................. 100/53; 192/129 B; 425/152; 425/153
[58] Field of Search .......... 100/53; 192/129 B, 131 R, 192/133, 134; 83/397; 425/152, 153, DIG. 45

[56] References Cited

U.S. PATENT DOCUMENTS

| | | | |
|---|---|---|---|
| 2,240,630 | 5/1941 | Stacy | 100/53 X |
| 2,584,534 | 2/1952 | Barnhardtson | 192/129 B |
| 2,946,277 | 7/1960 | Archer | 100/53 |
| 2,990,578 | 7/1961 | Adair | 425/152 |
| 3,143,957 | 8/1964 | Cornell | 100/53 |
| 3,359,598 | 12/1967 | Bucy | 425/153 |
| 3,541,950 | 11/1970 | Anderson | 100/53 |
| 3,554,067 | 1/1971 | Scutella | 83/397 |
| 3,650,650 | 3/1972 | Cook | 425/153 |

FOREIGN PATENT DOCUMENTS 1100940  3/1961  Fed. Rep. of Germany ........... 425/151

*Primary Examiner*—Billy J. Wilhite
*Attorney, Agent, or Firm*—Eugene F. Friedman

[57] ABSTRACT

A rocker-arm safety device which rotates into and out of the path of the movable platen on a press. When in the latter position, it allows the press to proceed normally through its usual operating cycle. When in the path of the platen, it protects an operator's hands in the working area by preventing the press from closing. A power source, separate from that for the press, rotates the arm between its positions. This assures its proper safety functioning notwithstanding some malfunction in the primary power source. To avoid damaging the axle on which the rocker arm pivots, the device includes a bar which contacts the arm when lying in the platen's path. The arm then transmits the force received from the platen to the bar, rather than to the axle. With no need to bear the weight of the press, the axle may move on needle or ball bearings to minimize the force needed to change the rocker arm's position. Where an air cylinder moves the rocker arm between positions, it may have ball- or needle-bearing couplings to the rocker arm and to the device's structure. Locating its coupling to the rocker arm at least three-fourths of the distance between the axle and its contact with the press facilitates the movement of the rocker arm and minimizes destruction of the cylinder.

21 Claims, 7 Drawing Figures

U.S. Patent    Jul. 17, 1979    Sheet 1 of 2    4,161,140
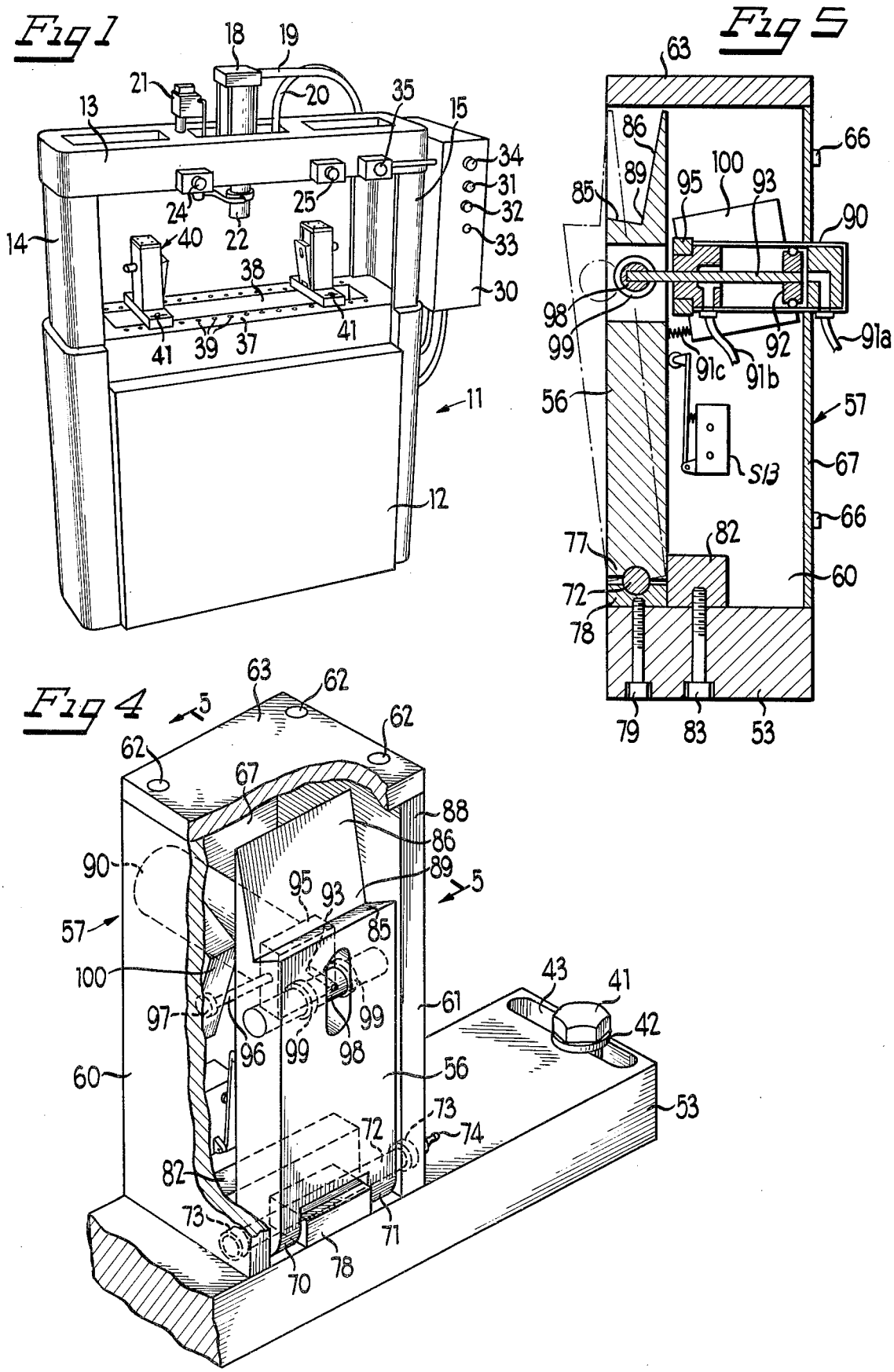

PROTECTED ROCKER-ARM SAFETY DEVICE FOR PRESSES

BACKGROUND

Power presses in which one platen moves towards another operate under tremendous forces. Unfortunately, such presses also generally require their human operators to, at some point in the operating cycle, place their hands between these platens. Unfortunately, on occasion the expectable results occur; workers with imperfect coordination fail to timely withdraw their hands from between the platens during the operation of the press. Many workers have suffered devastating injuries in this fashion.

To avoid the recurrence of such tragedies, various types of safety devices have found their way into this type of press. Some of these devices take the form of switches requiring a timed relationship in order to operate the press properly. These switches do not allow the movable platen to approach the other unless and until the operator has closed both switches at a substantially simultaneous time. Moreover, the operator cannot tape the switch closed since they must both open and close to operate. This type of device has the effect of requiring the operator to move his hands out of the working area before he can effectuate the operation of the press. Due to these switches, the accident record for such presses has drastically improved.

However, these coordinated hand switches, although beneficial, have not produced entirely accident-free operations. The controls of the machine may, for example, degenerate through long wear and allow the platens to close with their usual force. Since this may occur without the receipt of the required signals from the hand switches, the platens may close with the worker's hands in the path of the press. Thus, serious injury can still occur.

Furthermore, the movable platen on a press often occupies a position over the stationary platen. Opening the press requires moving the platen to an elevated position. There the press's mechanism holds the platen to provide the work area for the operator.

However, the mechanism supporting the movable platen in the elevated position may also degenerate through wear. Accordingly, although the controls indicate that the upper platen should remain elevated, it may slip down towards the fixed platen. Although not moving under full force of the press, it can still contact the operator's hands and injure him.

Accordingly, press manufacturers have sought further safety devices to guard against these albeit infrequent mishaps. Generally, they employ some sort of physical obstruction that prevents the moable platen from moving towards the other. This obstruction will generally have sufficient strength to withstand the full force of the press. Additionally, the manufacturers have tried to automate the placement and removal of the obstruction in the path of the platen. To do so, they have coordinated its motion with the happening of a separate event. This automation seeks to eliminate reliance upon the operator's memory to use this accident-preventing mechanism. It also eliminates the incorporation of an additional step in preparing the press for a cycle of operation.

T. F. Stacy, in his U.S. Pat. No. 2,240,630, shows a device which prevents the upper platen, when raised, from slipping and closing under the action of gravity and injuring the operator. To provide this protection, Stacy moves a pin into and out of the path of a bracket attached to the upper platen. However, this device provides absolutely no protection against the unintended closure of the platens under full force. Consequently, a mishap in the controls producing such a forced closing of the platens would still effect tragic consequences upon the operator.

In U.S. Pat. No. 2,946,277, L. F. Archer provides a rocker-arm device which rotates towards and away from the path of a press's moving platen. Neither of these positions fully removes the rocker arm from the platen's path. More significantly, when the rocker arm engages the moving platen, the full force propelling the platen becomes applied directly to the shaft on which the rocker arm pivots. After a number of these engagements, the shaft may very likely become disfigured or ruined due to the tremendous stress it withstands. Furthermore, the shaft could break in use, resulting in the disappearance of the intended safety measure.

Alternatively, making Archer's pivotal connection sufficiently strong to withstand such abuse would require a massive shaft with relatively rigid connections. This massive construction would impede the movement of the rocker arm between its positions, require a strong force to achieve these positional changes, and increase the expense of the overall unit.

Moreover, Archer simply operates the rocker arm off a direct mechanical link to one of the two hand-actuated valves applying the power to the press. Inadvertent actuation of this valve can result in the safety moving out of its protecting position at an undesired time.

F. M. Adair et al., in their U.S. Pat. No. 2,990,578, show two bell cranks which move between the platens when a guard covering the press's front opens. The pivot points of the bell cranks remain in front of the press to allow mechanical actuation by rollers attached to the guard. However, with the lever arms of the bell cranks lying in front of the press, they become vulnerable to accidental actuation and thus removed from the protecting position. Additionally, their location in front of the press interferes with its ordinary operation.

Additionally, a piece of foreign material can accidentally lodge between the bell cranks' bars and the lower platen. This material could derive from the actual work pieces in the pess itself. This material, however, could completely prevent the bars from assuming their protecting position and result in an unsafe machine.

Moreover, the roller mechanism on the guard could prevent the cranks from rotating completely into their position between the platens. Were that to happen, the pivot point of the bell cranks could absorb substantial amounts of the force propelling the platens together.

E. L. Cornell, Jr., in his U.S. Pat. No. 3,143,957, and E. W. Anderson, in his U.S. Pat. No. 3,541,950 show protective devices which rotate into the path of the moving platen. Cornell's device incorporates a rocker arm which pivots out of the platen's path when a feeler moves sufficiently downward to indicate the absence of a hand in the work area. Anderson partially removes his bar when the operator's hand actuates the operating switch to which the bar connects. However, should the rocker arm in either patent actually contact the moving platen, the pivotal connections of the devices receive the full force propelling the platen. As a result, these pivotal connections can suffer severe damage and totally lose their usefulness.

J. Scutella's U.S. Pat. No. 3,554,067 shows a safety guard operated on pneumatic and electric circuits. When a guard passes in front of the work area, which it presumably can do only upon the absence of an appendage in that area, the circuits allow the hydraulic press to operate. No mechanism appears, however, to prevent the descent of the platen at an unpropitious moment. Accordingly, even though the electric and pneumatic circuits operate properly, a malfunction in the hydraulic circuit may cause the press to descend.

While the devices of present presses have effected significant improvements in their safety records, accidents still occur. These unfortunate occasions illustrate the need for additional innovations that can further prevent or at least minimize the opportunity for injuries to workers.

SUMMARY

To operate properly, a safety device must have a substantially rigid member capable of withstanding, along at least one dimension, the force of the platens moving together. Typically, the force moves one of the platens towards the other, which remains fixed to the press's framework. Thus, the rigid member must normally withstand the full thrust of the force propelling the movable platen towards the stationary platen.

The device also includes a supporting structure to which the rigid member rotationally couples with the aid of an attaching means. The supporting structure has mounting means which allows its affixation to the framework of the pess itself. The supporting structure has a location on the press which must allow rotation of the rigid member between two positions. In the first, the member must lie at least partially in the path of a platen moving relative to it as the two platens close. In the second position, the member must lie out of the path of the relatively moving platen to allow the press to proceed through a cycle of operation. The attaching means generally includes a shaft about which the rigid member rotates.

Some form of a moving means, which couples to the rigid member, rotates it between these two positions. A controller then regulates the actuation of this moving device in order to place the rigid member in the appropriate position.

The safety device also includes a relief mechanism which couples to the structure of the safety device. It finds use when the rigid member occupies its first position and makes actual contact with the relatively moving platen. It relieves from the rotational coupling or attaching device the force imposed on the rigid member by the moving platen. Thus, although the member, usually a rocker arm, remains affixed to the rotational coupling, the relief device, and not the rotational coupling, receives the force of the platen.

The operation of the press may, of course, bring tremendous force upon the rocker arm should the latter assume its first or safety position. This may happen more than once. Yet, the axle or the rotational coupling of the rocker arm to its supporting structure need not bear this force and suffer possible damage. The relief device generally takes the form of a "knuckle joint", which includes two pieces of rigid material in contact with each other, and instead receives the brunt of this force.

Although it prevents the imposition of the press's force on the pivotal coupling of the rocker arm, the relief means remains out of the path of the moving platen. Consequently, it will not interfere with the operation of the press, regardless of how close the platens approach each other during the operating cycle.

BRIEF DESCRIPTION OF THE FIGURES

FIG. 1 gives a perspective view of a hydraulic press without the platens and showing the general location of the rocker-arm safety devices.

FIG. 4 has a perspective view, partly in cross section, of the safety device of FIG. 1.

FIG. 5 gives a cross-sectional view of the safety device of FIG. 4 along the line 5—5.

DETAILED DESCRIPTION

Figure 7:
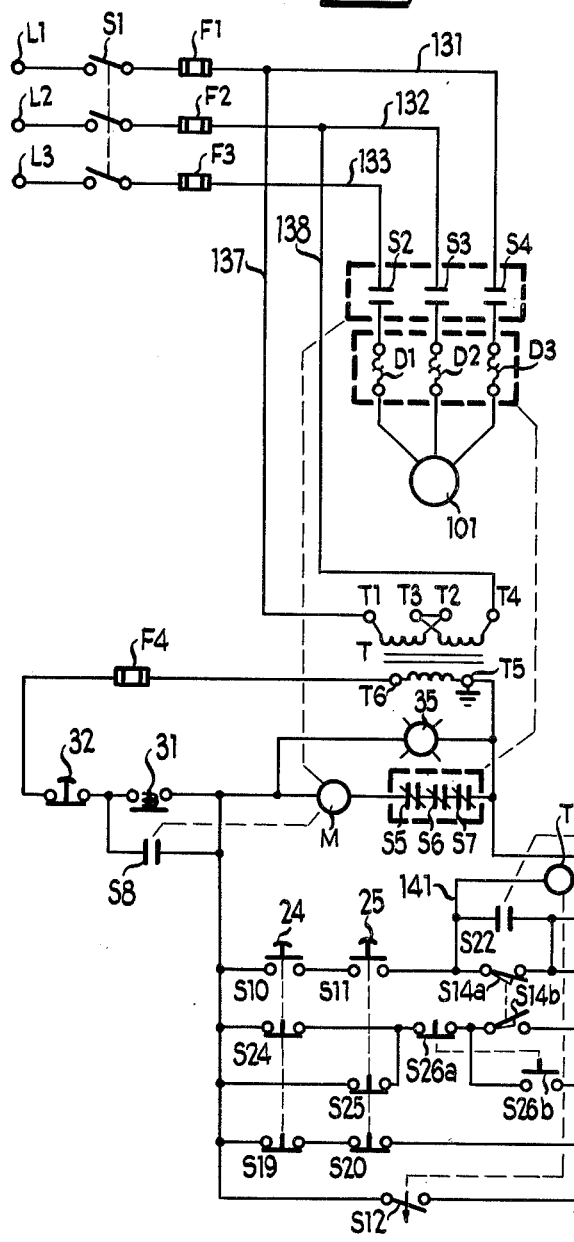
FIG. 7 shows a diagram for the electric circuit of the press of FIG. 1.

The press in FIG. 1, indicated generally at 11, includes the lower frame member 12, the upper frame member 13, and the side frame elements 14 and 15. The top frame 13 supports the hydraulic cylinder 18 to which connect the two hoses 19 and 20. The stroke controller 21 includes limit switches actuated by various positions of the piston 22 in the cylinder 18. On the press shown in FIG. 1, the two hand switches 24 and 25 appear on the upper frame 13. The switches 24 and 25 generally require the insertion of a person's thumb inisde cylinders surrounding the actual switch. This prevents their actuation with the elbow, which could possibly result in the operator's hand entering the work area during an operating cycle of the press.

The side frame member 15 also supports the control box 30. On the outside of the box 30 appear the starting switch 31 and the OFF switch 32. Below these two switches appears the key-operated switch 33, which determines whether the machine operates normally, as discussed below, or in the set-up mode. The latter mode allows the press to remain at its location on a downward stroke, simply by removing a hand from one of the switches 24 or 25. The normal operating mode would cause the piston 22, and thus the upper platen, to return to its raised position in the same circumstances. The pilot light 34 appears above these switches. The emergency stop switch 35 has a location adjacent to the hand switch 25. This allows its immediate actuation should the need arise.

The lower frame 12 has, at its top, the horizontal shelf 37 with the opening 38 through its middle. The shelf 37 supports the lower platen of the press. Bolts then pass through holes in the platen and into the holes 39 in the shelf 37 to hold the lower platen firmly in place. The shelf 37 also supports the safety devices 40. Bolts 41 pass through the washers 42 and through the openings 43 in the safety device 40, as seen more clearly in FIG. 4. They then attach to the openings 39 on the shelf 37 of the lower frame 12 to secure the safety devices 40 in their appropriate positions.

Figure 2:
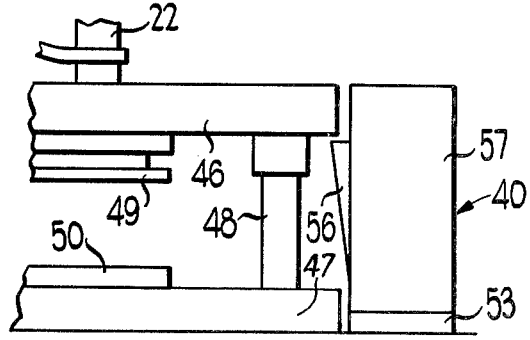
FIGS. 2 and 3 present frontal elevational views of a press showing the upper platen in the raised and lowered positions, respectively.

FIG. 2 shows the upper platen 46 in its raised position over the lower platen 47 secured to the lower frame 12. The guide posts 48 help assure the proper course of travel of the upper platen so that the upper die 49 properly meets the lower die 50 at the bottom of the stroke.

As shown in the figure, the proper location of the safety device 40 involves placing its base 53 against, or very close to, the bottom platen 47. In this position, the rocker arm 56, when extended outside the casing 57, falls within the path of the upper platen 46 as it approaches the lower platen 47. Consequently, the rocker arms 56 on the two safeties 40 extend into the path of the upper platen 46 and prevent its descent even under the full force of the hydraulic cylinder 18.

Figure 3:
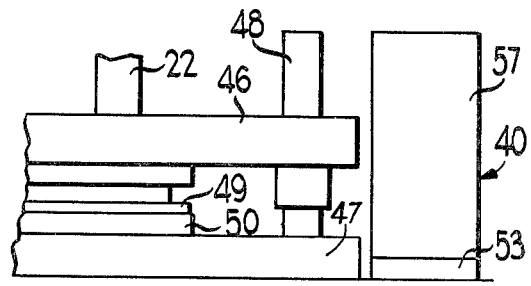

To proceed through an operating cycle, the rocker arm 56 must retract into the casing 57, as shown in FIG. 3. This will then allow the upper platen 46 to descend normally under the force of the hydraulic cylinder 18 and contact the lower platen 47. The control of the rocker arm 56 to provide a safe working environment receives discussion below with regards to FIG. 7.

The details of the safety device 40 appear more clearly in FIGS. 4 and 5. It includes the base 53 to which the housing 57 attaches. The housing 57 itself includes the two sides 60 and 61, which screws, not shown in the figures, attach to the base 53. The screws 62 attach the housing top 63 to the sides 60 and 61. Lastly, the screws 66 secure the back plate 67 to the sides 60 and 61.

The rocker arm 56 has the two legs 70 and 71, through which passes the shaft 72. The shaft 72 receives support from the needle bearings 73 which connect to the housing sides 60 and 61. Other types of bearings may find use in place of the needle bearings 73.

When first built, the openings in the legs 70 and 71 have sufficient clearance to allow unencumbered rotation about the shaft 72 which then remains fixed relative to the sides 60 and 61. Extended use, however, may alter this arrangement and cause the shaft 72 to rotate with the rocker arm 56. The needle bearings 73 eliminate most of the friction of rotation of the shaft 72 at its journalled connection to the sides 60 and 61. Additionally, the nipple 74 permits the introduction of a lubricant along the length of the shaft 72 to further eliminate any friction which would impede the free rotation of the rocker arm 56.

As FIG. 5 shows, the rocker arm 56 rotates between the retracted position, shown in solid lines, in the housing 57, and the extended position, shown in dashed lines. In the latter, of course, it prevents the accidental descent of the upper platen to avoid possible injury to a worker.

In the extended position, the outer bottom surface 77 of the rocker arm 56 between the legs 70 and 71 of the rocker arm 56 makes contact with the block 78, held rigidly to the base 53 by the screws 79. Should the press descend with the rocker arm 56 in the extended position, the force of the cylinder 18 will not come to bear upon the shaft 72. Rather, it will pass to the block 78 and the base 53 of the device 40 because of the contact of the bottom surface 77 of the rocker arm 56 with the block 78. Consequently, although the upper platen 46 may contact the lower platen 47 with the force of several tons, the shaft 72 bears substantially very little of this force and will suffer no damage. Thus, the block 78 prevents the possible destruction of the safety device 40.

Moreover, the block 78 obviates the need for a massive shaft to bear the brunt of the press. Moreover, the removal of any substantial force against the shaft 72 actually permits the utilization of the needle bearings 73. If the shaft 72 had to bear the full force of the press, the bearings 73 could not find use in the device 40; the exertion of the press's force on the shaft 72 would destroy them.

Thus, the block 78 obviates the possible breakage of the shaft 72 by the force of the press. Moreover, it permits the use of movable bearings 73 where the shaft connects to the sides 60 and 61. These bearings greatly reduce the resistance to the rotation of the shaft and minimize the force required to effectuate the rotations of the rocker arm 56.

An auxiliary block 82 sits behind the block 78, and the screws 83, passing through the base 53, hold it in place. Any force exerted by the uper platen 46 upon the rocker arm 56 in its extended position would force the bottom of the rocker arm backwards towards the inside of the housing 57. Such force might also move the block 78 in the same direction. The auxiliary block 82 prevents any such motion of the block 78 or the bottom of the rocker arm 56. As a further consequence, it also prevents the bottom of the rocker arm 56 from exerting a force in the same direction upon the shaft 72.

Should the upper platen actually contact the rocker arm 56, it will rest upon the ledge 85. The upper vertical surface 86 of the rocker arm 56 helps to properly seat the platen upon the ledge 85. As shown by the dashed line in FIG. 5, the vertical surface 86, when the rocker arm 56 occupies the extended position, does not lie precisely on a vertical line. Rather, it forms a slight angle with the forward edges 88 of the sides 60 and 61, with the bottom 89 of the surface 86 extending the furthest from the housing 57. Consequently, as the upper platen descends, it may contact the surface 86 intermediate its upper and lower extremities. As the press descends further, it will push against the surface 86, forcing the rocker arm 56 slightly backwards into the housing 57. Eventually, when the platen reaches the bottom of the surface 86, it will properly seat upon the ledge 85.

The pneumatic cylinder 90 effectuates the position changes of the rocker arm 56. Air pressure introduced along the line 91a forces the piston 92 and thus the rod 93 to the left in FIG. 5. This rotates the rocker arm 56 into its extended position, shown by the dashed line. Conversely, air pressure introduced along the conduit 91b forces the piston 92 and the rod 93 to the right to bring the rocker arm 56 into its retracted position inside of the housing 57. With air pressure in neither conduit 91a nor 91b, the spring 91c will push the rocker arm 56 outside the housing 57.

When the rocker arm 56 moves from the retracted to the extended position, the rod 93 and thus the cylinder 90 must point more in a downward direction. In other words, the connection between the rod 93 and the rocker arm 56 comes closer to the horizontal level of the base 53 in the extended position than in the retracted position. This becomes clearer were the motion of the rocker arm 56 to continue through ninety degrees of such rotation. At that point, the connection between the rod 93 and the rocker arm 56 would actually fall at the same height as the base 53. Consequently, the connection of the cylinder 90 to the walls 60 and 61 must permit a slight rotation of the cylinder. This then allows the angle between the rod 93 and the horizon to change slightly as the rocker arm 56 extends and retracts.

Furthermore, the angle between the rod 93 and the rocker arm 56 also changes as the rocker arm 56 changes its position. Accordingly, the connection between these two elements must also permit this angular change between them.

To connect the cylinder 90 to the walls 60 and 61, the collar 95 fits around the end of the cylinder 90. The collar 95 has, extending from its sides, the pins 96, which sit in the needle bearings 97. These bearings 97 remain affixed to the block 100, which has a rigid connection to the walls 60 and 61. The bearings provide the rotational connection of the pins 96 and thus the air cylinder 90 to the housing of the safety device.

The rod 93, in turn, connects to the shaft 98, which extends into the needle bearings 99 press fit into the rocker arm 56. The rotation of the shaft 98 in the bearings 99 allows for the almost frictionless change of angle between the rod 93 and the rocker arm 56.

The bearings 73, 97, and 99 minimize the friction that the air cylinder must overcome to move the rocker arm 56 between its positions. Requiring less force of the cylinder 90 helps to appreciably extend its life.

Furthermore, maximizing the distance between the bearings 73 and 99 on the rocker arm 56 also reduces the force required from the cylinder 90. The rocker arm 56 pivots about the bearings 73. Moving the cylinder 90 further away from this point produces the same rotational torque from a smaller force. Placing the bearings 99 three-fourths of the distance between the bearings 73 and the ledge 85 provides the cylinder 90 with a satisfactory lever-arm distance for its action.

Because of these factors, the cylinder 90 can operate effectively with a smaller force. It, thus, also moves more slowly. Consequently, the cylinder displays less of a tendency to destroy itself and enjoys a longer life.

Figure 6:
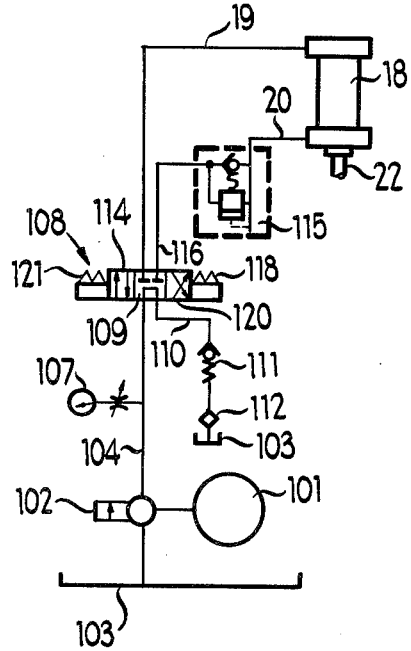
FIG. 6 has a circuit diagram for the hydraulics of the press of FIG. 1.

An exemplary hydraulic circuit providing the power for the press of the figures appears in FIG. 6. There, the motor 101 powers the pump 102, which provides oil under pressure from the reservoir 103 to the conduit 104. The gauge 107 indicates the pressure in the line 104. The oil in the line 104 then reaches the solenoid valve 108, which controls its flow.

The valve 108 has three positions. In the middle position, as shown, the oil from the conduit 104 passes through the center segment 109 of the valve 108, and into the line 110. In line 110, it flows through the check valve 111, the filter 112, and back into the reservoir 103. In other words, with the solenoid valve in the position shown, the oil in the line 104 does not reach the hydraulic cylinder 18.

When the valve 108 switches to the right, the oil from the line 104 passes through the left-hand segment 114 of the valve 108 and into the line 19. It enters the top of the cylinder 18 and exits its bottom through the line 20. Passing in this direction, the oil forces the rod 22 to descend from the cylinder 18 to effect a downward stroke of the press.

After exiting the cylinder 18 along the line 20, the oil then enters the counterbalance valve 115. The valve 115 simply maintains enough pressure in the cylinder 18 so that, when it receives no other force, the piston 22 will remain in the retracted or upward position. This prevents the press from slowly slipping downward when the solenoid valve 108 occupies the middle or neutral position.

From the counterbalance valve 115, the oil passes along the line 116, back through the left segment 114 of the valve 108 and into the line 110, ultimately returning to the reservoir 103. After the release of the electric current holding the valve 108 with the left-hand segment 114 aligned with the conduits, the spring 118 returns the valve 108 to the neutral position of FIG. 6.

When the solenoid valve 108 moves to the left in FIG. 6, it brings the right-hand segment 120 into alignment with the conduits. Then oil in the line 104 passes into the conduit 116, through the counterbalance valve 115, along the conduit 20, and into the bottom of the cylinder 18. It then forces the piston 22 back into the cylinder 18. The oil subsequently exits along the conduit 19 into the solenoid valve 108, through the conduit 110, and into the reservoir 103. The spring 121 helps return the solenoid valve 108 to its neutral position after the discontinuance of the electric current aligning the right portion 120 with the conduits.

The electrical circuit controlling the operation of the press appears in FIG. 7. The apparatus receives its power from the line connections L1, L2, and L3. It then goes through the disconnect switch S1, which simply turns the machine off should anyone open the control box. The current next passes through the fuses F1, F2, and F3, and into the leads 131, 132, and 133. The current then encounters the motor-starter switches S2, S3, and S4, and the heat detectors D1, D2, and D3, before reaching and powering the motor 101.

The leads 131 and 132 also supply current to the leads 137 and 138, respectively, which connect to the transformer T. The transformer T powers the remainder of the circuit. With the terminals T2 and T3 of the transformer T coupled together as shown, a voltage of 115 volts appears across the terminals T5 and T6 when the input at the connections L1, L2, and L3 provides 460 volts. Should the input, however, amount to 230 volts, then breaking the connection between the terminals T2 and T3 but connecting together the terminals T1 and T3 as well as T2 and T4 will again provide 115 volts between the terminals T5 and T6. The fuse F4 protects the control circuit from an overload.

To start the motor and actuate the control circuit, the operator closes the switch 31. This impresses the voltage across the emergency shut-down switch 32, the motor-starter induction solenoid M and the heater switches S5, S6, and S7, which normally remain closed. The voltage across the motor starter M, in particular, closes the switches S2, S3, and S4 in the leads 131, 132, and 133, so that the current may pass to the motor 101. The starter M also closes the switch S8 which then maintains a current path when the spring-actuated turn-on switch 31 returns to its normal, open position.

As long as a voltage remains across the motor starter M, the switches S2, S3, S4, and S8 remain closed and the circuit continues to operate. However, two occurrences can eliminate the voltage on the motor starter M, with the resultant stopping of both the motor 101 and the remainder of the control circuit. First, the operator may depress the emergency button 32, thus opening it. This causes a break in the line providing the motor starter M with voltage and consequently turns off the motor 101 and the control circuit.

Second, if the detectors D1, D2, or D3 sense an overheating of the motor 101, then the switches S5, S6, or S7, respectively, will open. Thus, the overheating of the motor 101 will also cause a complete shutting down of the circuit.

The bulb 35 lights whenever the circuit operates. It turns on immediately upon the closing of the start switch 31. Upon the release of the start switch 31, the light 35 remains on as long as the switch S8 remains closed. The switch S8 remains closed until the emergency switch 32 opens or one of the switches S5, S6, or S7 opens due to an overheating of the motor 101. Thus, as long as the circuit functions, the bulb 35 remains lit.

To cause a down stroke of the press, the operator must, with substantial simultaneity, depress the buttons 24 and 25. Depressing them closes the switches S10 and S11 and passes the voltage along the lead 141 to the time-delay relay TD1. The energization of the time-delay relay TD1 causes the switch S12 to close, which applies a potential to the solenoid A for the air cylinders and the safeties. The voltage applied to the solenoid A creates an air pressure in the cylinder to move the rocker arms out of the path of the upper platen. When the rocker arms retract out of the path of the platens, the switches S13 close, as FIG. 5 shows for one such switch.

At this point, the upper platen could begin its downward path. The switch S14a closes when and only when the press sits at the top of the stroke, which it does at the beginning of the cycle. The switch S15 opens only with the platen at the extreme bottom of its cycle. With the press at the top, consequently, both the switches S14a and S15 occupy the closed configuration. From above, with the rocker arms out of the path of the platen, the switches S13 occupy a closed attitude. Consequently, a voltage travels to the solenoid H1 of the relay 108 to move it, in FIG. 6, to the right and causes the oil pressure to initiate a down-stroke of the piston 22.

However, as soon as the piston 22 begins its downward movement, the switch S14a opens. Thus, the piston 22 and the upper platen cannot continue their downward descent. Only if the buttons 24 and 25 received substantially simultaneous actuation can the piston 22 continue downward. If one of the buttons 24 or 25 was depressed substantially before the other, the opening of the switch S14a prevents the further downward movement of the upper platen.

Before their actuation and, thus, with the buttons 24 and 25 open, as in FIG. 7, the circuit voltage passes across the switches S19 and S20 to the time-delay relay TD2. This energization of the time-delay relay TD2 keeps the switch S21 closed. Pushing the buttons 24 and 25 opens the switches S19 and S20 and deenergizes the relay TD2. However, the relay TD2 introduces a small time delay between its deenergization and the opening of the switch S21. During this small time delay, the switches S10 and S11 remain closed. Accordingly, the voltage passes across the switches S10 and S11, across the switch S14a before the press begins to move downward, and across the closed switch S21. It can then reach the half of the latching relay labelled LRL. Energization of the latching relay portion LRL closes the switch S22. As the press starts downward, the switch S14a opens as stated above. However, the voltage passing through the switches S10 and S11 travels across the switch S22, now closed, the switch S15 and the switch S13 to maintain the energization of the solenoid H1. Since the solenoid H1 remains energized, the relay 108 remains in the position where the oil pressure moves the piston 22 downward until it reaches its lowest position.

If one of the buttons 24 or 25 is depressed substantially before the other, the time-delay relay TD2 will open the switch S21 before the energization of the latching relay portion LRL. Consequently, the switch S22 cannot close to provide the alternate current path to the solenoid H1. Thus, as soon as the press starts down, switch S14a opens and no voltage passes to the solenoid H1 and the press can descend no further. This arrangement accordingly requires the simultaneous depression of the buttons 24 and 25. This prevents the operator from, for example, taping down one of the buttons 24 and 25 to make it "easier" and "quicker" to operate the press. Consequently, he must always apply pressure to the two buttons 24 and 25 and thus take his hands out of the operating area of the press in order for the press to proceed normally.

When the piston 22 reaches its lowermost point, the switch S15 opens and the solenoid H1 deenergizes. This causes the relay 108 to return to its neutral position, where cylinder 18 cannot exert any further pressure in a downward direction on the piston 22.

Releasing either of the buttons 24 or 25 also closes switches S24 or S25, respectively. Furthermore, the switch S14b, which connects with the switch S14a, remains closed all the time except when the piston 22 reaches the top of its stroke. In particular, it occupies the closed position with the piston 22 at the bottom of the stroke. Consequently, the voltage traversing the switches S24, S25, or both passes across the switch S26a, normally closed, as indicated, and across the switch S14b, and to the solenoid H2. This energization of the solenoid H2 causes the right-hand portion 120 of the relay 108 to align with the conduits 19 and 20. The cylinder 18 then receives the oil pressure in the direction causing it to raise the piston 22 and to return the platen to its upper position.

When the piston 22 reaches its uppermost position, the switch S14b opens. This cuts off the voltage to the solenoid H2, which then allows the relay 108 to return to its central or neutral position, indicated in FIG. 6. Thus, when the piston 22 reaches its top position, no further hydraulic pressure, which would try to force the piston 22 to go even further upwards, will reach the cylinder 18.

However, the piston 22 need not reach the lowest portion of its stroke before it can start its return to its upward position. With the switch S26a closed, releasing either of the buttons 24 or 25, even during the middle of its stroke, will cause the piston 22 to return upward. Following a similar discussion as above, releasing either button 24 or 25 will cause current to pass through the switches S24 or S25, respectively. It then travels across the closed switch S26a and S14b to energize the solenoid H2. The relay 108, as a result, will then assume the configuration which will cause the cylinder 18 to raise the piston 22 and the upper platen.

Furthermore, the latching relay portion LRU, which forms a single unit with the latching relay portion LRL, also becomes energized and opens the switch S22. The opening of the switch S22 cuts off the voltage to the solenoid H1. Consequently, it cannot oppose the efforts of the solenoid H2 to move the relay 108 to the position which will raise the piston 22. Moreover, the latching relay portion LRL cannot then reclose the switch S22 until, at least, the switch S14a closes. That, however, cannot occur until the piston 22 and thus the upper platen reaches its uppermost position, and not before.

When placing new dies in the press, the operator who sets it up initially may wish to move the upper platen down to various locations. Holding it there allows him to compare it to the lower platen, and from there move it down further increments. As discussed above, however, releasing either of the buttons 24 or 25 will immediately cease the donward motion of the upper platen and cause it to return to its uppermost position. This does not permit the operator to make the visual comparisons between the two platens that he must in order to properly adjust them for the normal run. However, opening the switch S26a and, at the same time, closing the connected switch S26b allows him to accomplish this task. He controls the switches S26a and S26b through the key mechanism 33 on the panel of the control box 30 shown in FIG. 1.

With the switch S26a open and the switch S26b closed, the solenoid H2 and the latching relay portion LRU can become energized from current passing through the switch S26b. This occurs only when the operator releases *both* of the buttons 24 and 25. Otherwise, the solenoid H2 does not receive the circuit voltage or move the relay 108 to the position which causes the piston 22 to move upward. Thus, simply releasing one of the buttons 24 or 25 will not, without the release of the other, return the piston 22 upward back into the cylinder 18. Furthermore, with one of the buttons 24 or 25 released, the solenoid H1 no longer receives any voltage. Since the solenoid H2 also receives no voltage, the relay 108 resumes its neutral position. As a result, the platen remains at the point to which it had descended immediately prior to the release of one of the buttons 24 or 25.

Furthermore, with only one of the buttons 24 or 25 released, the latching relay portion LRU also receives no energization. Consequently, during the release of only one button, the switch S22 remains closed. At this point, depressing the released button will allow the circuit voltage to pass through the switches S10 and S11 and the switch S22, which has remained closed. The voltage then becomes applied to the solenoid H1 and causes the upper platen to resume its downward motion.

Consequently, with the switch S26a open and the switch S26b closed, depressing both buttons S24 and S25 moves the upper platen down. Releasing one of these buttons causes the platen simply to stop and remain in place. Depressing the released button allows the upper platen to continue on its downward course. Releasing both buttons 24 and 25 finally returns the upper platen to its uppermost position. This set-up mode allows the operator to actuate the downward movement of the upper platen with only one hand on the buttons 24 and 25. This would obviate the safety requirement of requiring him to press both buttons and thus remove both hands from the work area.

Clearly, he should not run the press in this mode during its normal operation. Consequently, the lock 33 prevents the unauthorized placement of the switches S26a and S26b in this set-up configuration.

The table gives typical components for a satisfactorily operating circuit.

Table

| Item | Components Used in the Figures — Component |
|---|---|
| 18=22 | Vickers Series 2TH BB MTG Non-cushioned Cap End, 4" Bore 8" Stk 2¼" Rod Style SM. Ortman-Miller cylinder |
| 24, 25 | 800 TD1B1 A-B (Allen Bradley) |
| 30 | Hoffman Box A-ZOAB2108LP NEMA 12 |
| 31 | Start Button 8007 A2A A-B |
| 32 | Emergency Stop Button 800TDGA A-B |
| 35 | A-B Pilot Light 800Z-PT16R |
| 101 | 10 HP 460/230 1800 RPM ODP |
| 102 | Vickers PVB 20-FR-SFW 20611 |
| 103 | Vickers T-60 Reservoir |
| 107 | Marsh Pressure-Check Gauge & Shut-off |
| 108=H1=H2 | Vickers DG SS4-064C-S1 Vickers DG SM-06-50 Vickers BKDG-06-635 |
| 111 | Vickers D8P1-06-65 |
| 112 | Schroeder TF1-2A-10 |
| 115 | Vickers RCT-06-D1-20 |
| A | Miller Fluid Power DP-7-10 Cylinder |

Table -continued

| Item | Components Used in the Figures — Component |
|---|---|
| F1=F2=F3=F4 | Multi Fuse Block FRN 1-6 Fuse |
| D1=S5, D2=S6, D3=S7 | A-B N34 Heaters |
| LRL=LRU=S22 | Latching Relay 700 BXL 220 A-B |
| M=S2=S3=S4=S8 | A-B 709BOD |
| S1 | A-B 1494R-NFL 30 |
| S13 | Limit Switch A-B 802T-ATW2 |
| S14, S15 | Limit Switch A-B 802T-HW2 |
| S26a=S26b | Key Operated A-B 800T-H33A |
| T | A-B Transformer 1497-NS |
| TD1, TD2 | Pneumatic Timer A-B 849A-ZOD 24 |

Accordingly, what is claimed is:

1. A safety device for a press of the type having two platens coupled to a framework with the first of said platens movable under an applied force toward the second of said platens, said safety device comprising:
   (A) a substantially rigid member capable of withstanding, along at least one dimension, the force of one of said platens moving towards the other of said platens;
   (B) a supporting structure including mounting means for allowing the affixing of said supporting structure to said press;
   (C) attaching means, coupled to said member and said structure, for rotationally coupling said member to said structure, said attaching means allowing rotation of said member about an axis passing through said member between first and second positions, said mounting means allowing the affixing of said structure to said press with said member, when in said first position, lying partly in the path of a platen moving relative to said member as said first platen moves towards said second platen and having an angular disposition relative to said path of said relatively moving platen, and, when in said second position, lying out of said path of said relatively moving platen;
   (D) moving means, coupled to said member, for rotating said member between said first and said second positions;
   (E) relief means, coupled to said structure, for, (1) with said structure affixed to said press, (2) said member in said first position, and (3) said member in contact with said relatively moving platen, relieving from said attaching means substantially all force imposed on said member by said relatively moving platen, said relief means lying out of the path of said relatively moving platen as first platen moves towards said second platen; and
   (F) control means for regulating the actuation of said moving means.

2. The device of claim 1 wherein said mounting means affixes said structure to said framework of said press, said axis remains nonmovable relative to said second platen as said first platen moves toward said second platen, and said first position of said member lies partly in the path of said first platen as said fist platen moves toward said second platen.

3. The device of claim 2 wherein (1) said member is an elongated member having first and second ends; (2) said axis passes through said second end of said member; and (3) with said member in said first position and said mounting means affixing said structure to said framework with said member, when in said first position, lying partly in the path of said first platen, said second end of said member lies entirely out of said path of said first platen.

4. The device of claim 3 wherein said first end is higher than said second end and said relief means includes a rigid element affixed to said supporting structure and positioned above the level of the lower end of said second end, said element having a first surface which, when said member occupies said first position, contacts a second surface on said second end of said member and prevents motion of said second surface in the direction of motion of said first platen moving towards said second platen.

5. The device of claim 3 wherein said relief means includes a rigid piece of material, separated, when said structure is affixed to said framework, from the path of said first platen moving towards said second platen, by said second end of said member, said rigid piece being secured to said supporting structure above and abutting said second end of said member.

6. The device of claim 4 wherein said first end of said member has a first contacting surface and a second contacting surface with, when said structure is affixed to said framework and said member is in said first position, (1) said first contacting surface making a nonzero acute angle of less than 25° relative to the path of said first platen as it moves towards said second platen, the portion of said first contacting surface lying furthest away from said axis lying furthest away from said path of said first platen, and (2) said second contacting surface making a substantially perpendicular angle relative to the path of said first platen, said second contacting surface extending closer to the path of said first platen than said first contacting surface.

7. The device of claim 4 wherein (1) said attaching means includes a shaft rotationally coupled to said member and to said supporting structure, said axis passing through the center of said shaft, and (2) said moving means includes a linearly extensible mechanism having first and second configurations, said second configuration being longer in at least one dimension than said first configuration, said mechanism being movable between said first and said second configurations in response to signals provided by said control means, said mechanism being rotationally coupled to said structure and to said member.

8. The device of claim 7 including first force-providing means for effecting changes between said first and second configurations of said mechanism and second force-providing means for moving said first platen of said press on which press said device is to be coupled, said first force-providing means being of a different type than said second force-providing means.

9. The device of claim 7 including self-return means forming part of said moving means for, in the absence of any power for said moving means, placing said member in said first position, said self-return means being self-powered.

10. The device of claim 9 wherein said self-return means includes a spring under tension.

11. The device of claim 7 wherein the rotational coupling of said extensible mechanism lies away from said axis at least ¾ of the distance between said axis and the point on said first end of said member closest to said axis and, with said member in said first position, making contact with said first platen.

12. The device of claim 11 further including movable bearings providing the coupling between said shaft and said structure.

13. The device of claim 12 further including lubricating means for allowing the passage of a lubricant between said shaft and said member.

14. The device of claim 7 further including lubricating means for allowing the passage of a lubricant between said shaft and said member.

15. The device of claim 14 further including movable bearings providing the coupling between said shaft and said structure.

16. In a press of the type having two platens coupled to a framework with the first of said platens movable under an applied force towards the second of said platens, the improvement comprising:
    (A) a substantially rigid member capable of withstanding, along at least one dimension, the force of one of said platens moving towards the other of said platens;
    (B) a supporting structure coupled to said press and including mounting means for affixing said structure to said press;
    (C) attaching means coupled to said member and to said structure for rotationally coupling said member to said structure, said attaching means allowing rotation of said member between a first position lying partly in the path of a relatively moving platen moving relative to said member as said first platen moves towards said second platen and having an angular disposition relative to said relatively moving platen, and a second position, lying out of said path of said relatively moving platen;
    (D) moving means, coupled to said member, for rotating said member between said first and said second positions;
    (E) relief means, coupled to said structure, for, with said member in said first position and in contact with said relatively moving platen, relieving from said attaching means substantially all force imposed on said member by said relatively moving platen, said relief means lying out of the path of said relatively moving platen as said first platen moves towards said second platen; and
    (F) control means for regulating the actuation of said moving means.

17. The improvement of claim 16 wherein (1) said mounting means affixes said structure to said framework of said press with said axis remaining nonmovable relative to said second platen as said first platen moves toward said second platen; (2) said member is an elongated member having first and second ends, with (a) said axis passing through said second end of said member and (b) said second end of said member lying entirely out of said path of said first platen; (3) said first end is higher than said second end; and (4) said relief means includes a rigid element affixed to said supporting structure and positioned above the lower end of said second end, said element having a first surface, which, when said member occupies said first position, contacts a second surface on said second end of said member, said first surface preventing motion of said second surface in the direction of motion of said first platen as said first platen moves toward said second platen.

18. The improvement of claim 17 wherein said relief means includes a rigid piece of material separated from the path of said first platen moving towards said second platen by said second end of said member, said rigid piece being secured to said supporting structure above and abutting said second end of said member.

19. The improvement of claim 17 wherein said first end of said member has a first contacting surface and a second contacting surface, with, when said member is in said first position, (1) said first surface lying partly in said path of said first platen as it moves towards said second platen and making a nonzero acute angle of less than 25° relative to said path of said first platen, the portion of said first contacting surface lying furthest away from said axis lying furthest away from said path of said first platen, and (2) said second contacting surface lying substantially wholly in said path of said first platen as it moves towards said second platen and making a substantially perpendicular angle relative to said path of said first platen.

20. The improvement of claim 17 wherein said attaching means includes (1) a shaft rotationally coupled to said member and to said supporting structure, said axis passing through the center of said shaft, and (2) said moving means includes (a) a linearly extensible mechanism having first and second configurations, said second configuration being longer in at least one dimension than said first configuration, said mechanism being movable between said first and said second configurations in response to signals provided by said control means, said mechanism being rotationally coupled to said structure and to said member, the force-providing means for effecting change between said first and second configurations of said mechanism being of a different type than the force-providing means for moving said first platen and (b) a self-powered self-return means for, in the absence of any power for said moving means, placing said member in said first position.

21. The improvement of claim 20 wherein the rotational coupling of said extensible mechanism lies away from said axis at least ¾ of the distance between said axis and the point on said first end of said member closest to said axis and, with said member in said first position, making contact with said first platen, and further including (1) movable bearings providing the coupling between said shaft and said structure and (2) lubricating means allowing the passage of a lubricant between said shaft and said member.

* * * * *